(12) United States Patent
Nagashima et al.

(10) Patent No.: US 12,372,110 B2
(45) Date of Patent: Jul. 29, 2025

(54) SELF-PIERCING RIVET AND MANUFACTURING METHOD FOR FASTENING STRUCTURE

(71) Applicant: TOYOTA JIDOSHA KABUSHIKI KAISHA, Toyota (JP)

(72) Inventors: Shinya Nagashima, Kariya (JP);
Toshiyuki Dobashi, Nagoya (JP);
Nobuyuki Shinohara, Tajimi (JP);
Mayumi Nakanishi, Okazaki (JP);
Reona Takagishi, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/403,933

(22) Filed: Jan. 4, 2024

(65) Prior Publication Data

US 2024/0318680 A1 Sep. 26, 2024

(30) Foreign Application Priority Data

Mar. 22, 2023 (JP) ................................. 2023-045966

(51) Int. Cl.
| | |
|---|---|
| *F16B 19/10* | (2006.01) |
| *B21J 15/02* | (2006.01) |
| *F16B 5/04* | (2006.01) |
| *F16B 19/08* | (2006.01) |
| *B21J 15/36* | (2006.01) |

(52) U.S. Cl.
CPC .......... *F16B 19/086* (2013.01); *B21J 15/025* (2013.01); *F16B 5/04* (2013.01); *B21J 15/36* (2013.01)

(58) Field of Classification Search
CPC ......... F16B 19/086; F16B 5/04; B21J 15/025; B21J 15/36
See application file for complete search history.

(56) References Cited

FOREIGN PATENT DOCUMENTS

| JP | 2013-068233 A | 4/2013 | |
|---|---|---|---|
| KR | 1868403 B1 * | 6/2018 | ............. F16B 19/04 |
| KR | 2019080496 A * | 7/2019 | ............. F16B 19/086 |

OTHER PUBLICATIONS

English translation of KR101868403 (Year: 2018).*
English translation of KR20190080496A (Year: 2019).*

* cited by examiner

*Primary Examiner* — Jun S Yoo
(74) *Attorney, Agent, or Firm* — SoraIP, Inc

(57) ABSTRACT

A self-piercing rivet includes a head, an outer cylindrical part extending from the head and formed in a cylindrical shape, and an inner cylindrical part extending from the head, provided spaced apart inside the outer cylindrical part, and formed in a cylindrical shape. In the manufacturing method for a fastening structure, a self-piercing rivet is driven into an overlapping part of a first fastened member and a second fastened member to fasten the first fastened member and the second fastened member.

2 Claims, 5 Drawing Sheets

SELF-PIERCING RIVET AND MANUFACTURING METHOD FOR FASTENING STRUCTURE

CROSS-REFERENCE TO RELATED APPLICATION

This application claims priority to Japanese Patent Application No. 2023-045966 filed on Mar. 22, 2023 incorporated herein by reference in its entirety.

BACKGROUND

1. Technical Field

The present disclosure relates to a self-piercing rivet and a manufacturing method for a fastening structure.

2. Description of Related Art

Various techniques related to a self-piercing rivet have been disclosed (for example, see Japanese Unexamined Patent Application Publication No. 2013-68233 (JP 2013-68233 A) below). In order to fasten a plurality of fastened members with such a self-piercing rivet and ensure the fastening strength, it is necessary to thicken a cylindrical part (also referred to as a body part or a leg part) of the self-piercing rivet to a certain degree. On the other hand, a configuration in which the cylindrical part of the self-piercing rivet is thick is disadvantageous in suppressing a crack in a lower fastened member (the undermost-layer fastened member) caused by driving the self-piercing rivet.

Here, as a technique of reducing the thickness of the cylindrical part of the self-piercing rivet, there is a technique disclosed in the following JP 2013-68233 A. In this prior art, the self-piercing rivet has a double-tube structure consisting of an outer tube and an inner tube, the body part of the outer tube is driven in advance at an overlapping location of a plurality of connected members, and the body part of the inner tube is being driven with a time difference. When the driving is completed, the body part of the outer tube and the body part of the inner tube are in contact with each other and are in an integrated state, and the tip side is configured to bite into the inside of the lower connected member.

SUMMARY

However, in the above prior art, the timing of driving of the body part of the outer tube and the timing of driving of the body part of the inner tube are staggered. Therefore, there is room for improvement in terms of manufacturing efficiency, and there is also room for improvement in terms of simplification of the structure.

In consideration of the above facts, an object of the present disclosure is to provide a self-piercing rivet and a manufacturing method for a fastening structure that can suppress a crack in a lower fastened member with a simple configuration while maintaining manufacturing efficiency.

A self-piercing rivet of the present disclosure according to claim 1 is a self-piercing rivet that fastens a plurality of fastened members by being driven into an overlapping part of the fastened members, and includes a head, an outer cylindrical part that extends from the head, that is provided in a cylindrical shape, and in which a tip side deforms radially outward when driven into the overlapping part, and an inner cylindrical part that extends from the head and provided in an inner side of the outer cylindrical part while being distanced from the outer cylindrical part, that is provided in a cylindrical shape, and in which a tip side deforms radially outward or radially inward when driven into the overlapping part.

According to the above configuration, each of the outer cylindrical part and the inner cylindrical part extends from the head, and the inner cylindrical part is provided in an inner side of the outer cylindrical part while being distanced from the outer cylindrical part. When the self-piercing rivet is driven into the overlapping part of the fastened members, the outer cylindrical part and the inner cylindrical part that are distanced from each other, are driven into the overlapping part together, the tip side of the outer cylindrical part deforms radially outward, and the tip side of the inner cylindrical part deforms radially outward or radially inward. Therefore, while maintaining manufacturing efficiency, it is possible to maintain fastening strength (joining strength) while reducing the thickness of each of the outer cylindrical part and the inner cylindrical part, for example, compared to a comparative example with one cylindrical part. Further, by reducing the thickness of each of the outer cylindrical part and the inner cylindrical part, the lower fastened member is less likely to crack when driving the self-piercing rivet.

In the self-piercing rivet of the present disclosure according to claim 1, a tip part of the outer cylindrical part is provided with an inclined inner surface in which an inner diameter is gradually increased toward the tip side, and a tip part of the inner cylindrical part is provided with an inclined outer surface in which an outer diameter is gradually decreased toward the tip side.

According to the above configuration, since a tip part of the outer cylindrical part is provided with an inclined inner surface in which an inner diameter is gradually increased toward the tip side, when the self-piercing rivet is driven into the overlapped part of the fastened members, the outer cylindrical part bites into the inside of the overlapping part while the tip side deforms radially outward due to the force applied to the inclined inner surface during the driving process. On the other hand, since a tip part of the inner cylindrical part is provided with an inclined outer surface in which an outer diameter is gradually decreased toward the tip side, when the self-piercing rivet is driven into the overlapped part of the fastened members, the inner cylindrical part bites into the inside of the overlapping part while the tip side deforms radially inward due to the force applied to the inclined outer surface during the driving process. Therefore, the overlapping part can be firmly fastened by the self-piercing rivet.

In a manufacturing method for a fastening structure of the present disclosure, the self-piercing rivet according to claim 1 is driven into an overlapping part of a plurality of fastened members to fasten the fastened members.

According to the above configuration, when the self-piercing rivet is driven into the overlapping part of the fastened members, the outer cylindrical part and the inner cylindrical part that are distanced from each other are driven into the overlapping part together, the tip side of the outer cylindrical part deforms radially outward, and the tip side of the inner cylindrical part deforms radially outward or radially inward. Therefore, while maintaining manufacturing efficiency, it is possible to maintain fastening strength (joining strength) while reducing the thickness of each of the outer cylindrical part and the inner cylindrical part, for example, compared to a comparative example with one cylindrical part. Further, by reducing the thickness of each of the outer cylindrical part and the inner cylindrical part, the lower fastened member is less likely to crack when driving the self-piercing rivet.

As described above, the present disclosure has an excellent effect in that it is possible to suppress a crack in the lower fastened member with a simple configuration while maintaining manufacturing efficiency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

A self-piercing rivet and a manufacturing method for a fastening structure according to a first embodiment of the present disclosure will be described with reference to FIGS. 1 to 4.

Figure 1:
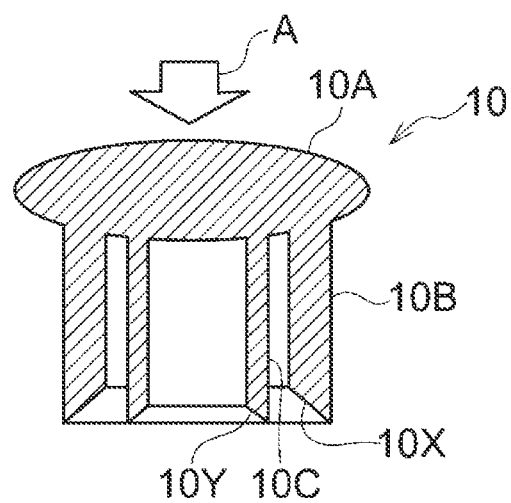
FIG. 1 is a sectional view showing a self-piercing rivet, a first fastened member, and a second fastened member according to a first embodiment in a state before the self-piercing rivet is driven.
Figure 1:
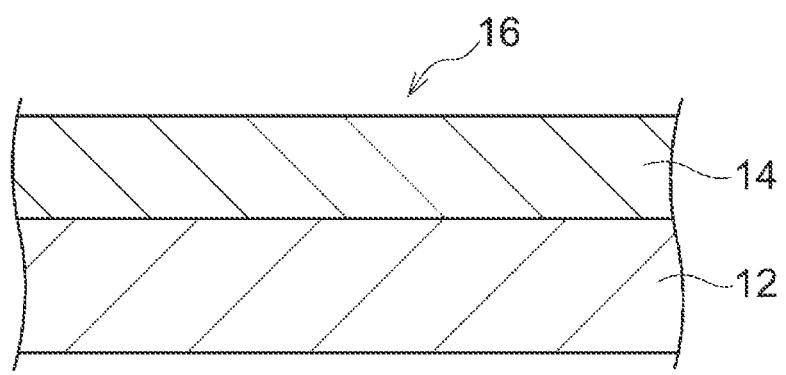

FIG. 1 shows a cross-sectional view of a self-piercing rivet 10 and an example of a first fastened member 12 and a second fastened member 14 as fastened members before the self-piercing rivet 10 is driven.

The self-piercing rivet 10 is made of special steel such as chromium molybdenum steel. The self-piercing rivet 10 is driven into the overlapping part of the plurality of fastened members (in FIG. 1, the overlapping part 16 of the first fastened member 12 and the second fastened member 14), thereby tightening the plurality of fastened members. This is a fastener for fastening the first fastened member 12 and the second fastened member 14 in FIG. 1.

The self-piercing rivet 10 includes a head 10A, an outer cylindrical part 10B integrally extending from the head 10A and formed into a cylindrical shape, and an outer cylindrical part 10B integrally extending from the head 10A. It has an inner cylindrical part 10C that is spaced apart and formed in a cylindrical shape. The inner cylindrical part 10C is set thinner than the outer cylindrical part 10B.

The tip part of the outer cylindrical part 10B is formed with an inclined inner surface 10X whose inner diameter gradually increases toward the tip. Thereby, when the outer cylindrical part 10B is driven into the overlapping part 16 of the first fastened member 12 and the second fastened member 14, the distal end side is deformed radially outward. Further, an inclined inner surface 10Y whose inner diameter is gradually enlarged is formed at the tip part of the inner cylindrical part 10C. Thereby, when the inner cylindrical part 10C is driven into the overlapping part 16 of the first fastened member 12 and the second fastened member 14, the tip side thereof is deformed radially outward.

The tip position of the outer cylindrical part 10B and the tip position of the inner cylindrical part 10C are aligned in the axial direction of the self-piercing rivet 10. Note that in FIG. 1, arrow A indicates the direction in which the self-piercing rivet 10 is driven into the overlapping part 16 of the first fastened member 12 and the second fastened member 14.

The first fastened member 12 and the second fastened member 14 are both made of metal, for example. More specifically, the first fastened member 12 is made of aluminum alloy, and the second fastened member 14 is made of steel. Further, the first fastened member 12 is, for example, a die-cast product formed by die-casting. The first fastened member 12 and the second fastened member 14 are, for example, members for a vehicle.

Figure 2:
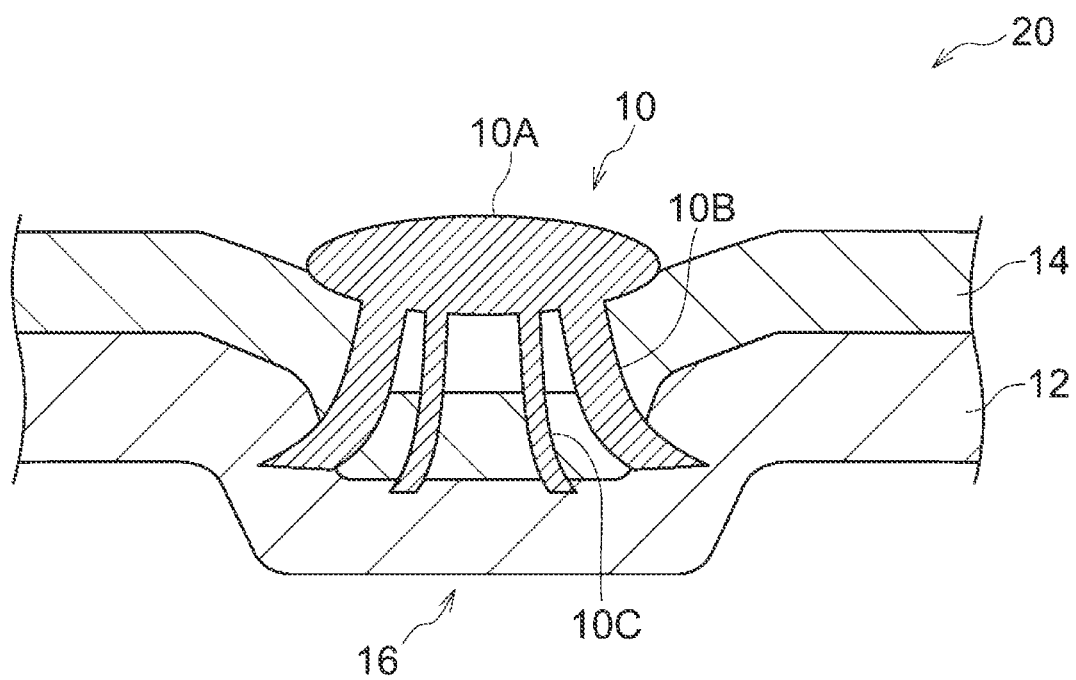
FIG. 2 is a sectional view showing a fastening structure manufactured by the manufacturing method for a fastening structure according to the first embodiment.

The manufacturing method for a fastening structure according to the present embodiment is a method of manufacturing the fastening structure 20 by fastening a first fastened member 12 and a second fastened member 14 as shown in FIG. 2 by driving a self-piercing rivet 10 into an overlapping part 16 of the first fastened member 12 and the second fastened member 14.

Figure 3:
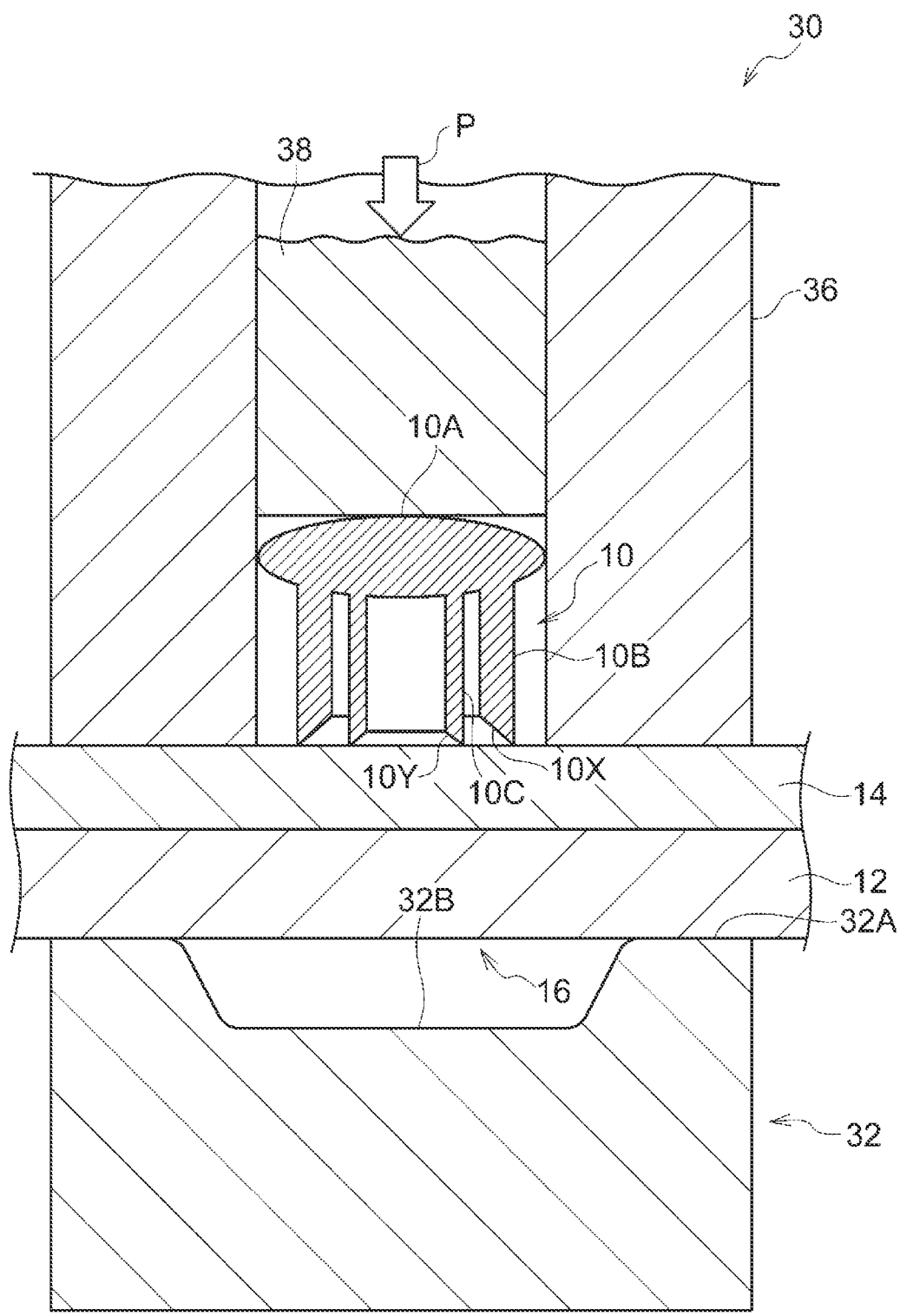
FIG. 3 is a sectional view showing an example of a fastening device used in the manufacturing method for a fastening structure according to the first embodiment together with a first fastened member, a second fastened member, and a self-piercing rivet.

Next, an example of an apparatus used in the method for manufacturing the fastening structure 20 will be described with reference to FIG. 3. FIG. 3 shows an example of a fastening device 30 used in the manufacturing method for a fastening structure according to this embodiment.

As shown in FIG. 3, the fastening device 30 includes a die 32 as a support member that supports the first fastened member 12 from the side opposite to the driving side of the self-piercing rivet 10. The die 32 is made of steel, for example, and has a general support surface 32A that supports the first fastened member 12 from below. Further, the die 32 is formed with a recess 32B that comes into contact with the deformed portion when the first fastened member 12 is deformed by driving the self-piercing rivet 10. The recess 32B is recessed with respect to the general support surface 32A, and is formed in a circular shape in a plan view.

The fastening device 30 also includes a cylinder 36 and a punch 38. The cylinder 36 is formed into a cylindrical shape, and the self-piercing rivet 10 can be inserted into the cylinder 36. Further, the cylinder 36 is arranged such that its axis corresponds to the center of the recess 32B of the die 32, and the cylinder 36 is arranged so that the first fastened member 12 and the second fastened member 14 supported by the die 32 are pressed against the general support surface 32A side of the die 32. The punch 38 is a cylindrical member that is movable in the axial direction within the cylinder 36 by a drive device (not shown), and configured to be able to press the self-piercing rivet 10 inserted into the cylinder 36 from above. In addition, in the figure, the direction in which the punch 38 presses the self-piercing rivet 10 is indicated by an arrow P.

Next, a manufacturing method for a fastening structure will be described with reference to FIGS. 3 and 4.

First, as shown in FIG. 3, the first fastened member 12 is supported by the general support surface 32A of the die 32, and the second fastened member 14 is superimposed on the first fastened member 12. In the present embodiment, as an example, an end portion of the first fastened member 12 (an end portion in a direction perpendicular to the paper surface of FIG. 3) is supported by the die 32. Next, the first fastened member 12 and the second fastened member 14 are sandwiched between the lower end surface of the cylinder 36 and the general support surface 32A of the die 32.

Next, the self-piercing rivet 10 inside the cylinder 36 is pushed from above with the punch 38. As a result, as shown in FIG. 4, the self-piercing rivet 10 descends, the outer cylindrical part 10B and the inner cylindrical part 10C of the self-piercing rivet 10 penetrate the second fastened member 14, and the first fastened member 12 pressed by the self-piercing rivet 10 and the second fastened member 14 is deformed toward the recess 32B side of the die 32. A part of the first fastened member 12 deforms along the recess 32B, and each tip side of the outer cylindrical part 10B and the inner cylindrical part 10C of the self-piercing rivet 10 deforms radially outward while biting into the first fastened member 12. Thereafter, the cylinder 36 and the punch 38 are raised, and the fastening structure 20 shown in FIG. 2 is taken out from the fastening device 30.

Next, the functions and effects of this embodiment will be explained.

Figure 4:
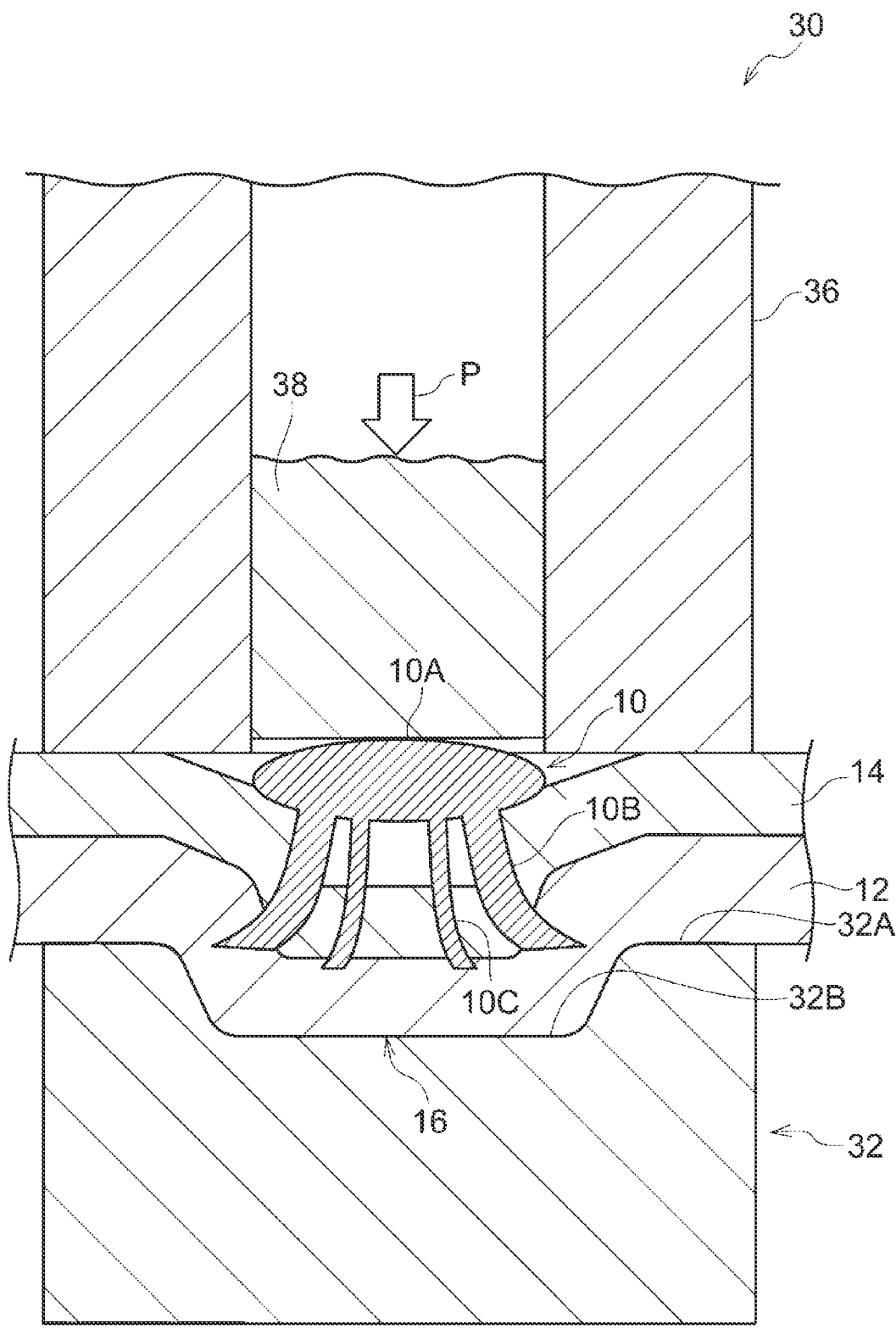
FIG. 4 is a sectional view showing a state in which a self-piercing rivet is driven into the overlapping part of the first fastened member and the second fastened member from the state shown in FIG. 3.

In this embodiment, when the self-piercing rivet 10 is driven into the overlapping part 16 of the first fastened member 12 and the second fastened member 14 as shown in FIG. 4, the outer cylindrical part 10B and the inner cylindrical part 10C that are distanced from each other are driven together into the overlapping part 16, and the distal ends of the outer cylindrical part 10B and the inner cylindrical part 10C are deformed radially outward. Therefore, while maintaining manufacturing efficiency, for example, the thickness of each of the outer cylindrical part 10B and the inner cylindrical part 10C can be reduced compared to a comparative example with one cylindrical part, and the fastening strength (joining strength) can be maintained. Further, since the outer cylindrical part 10B and the inner cylindrical part 10C are each thin, the first fastened member 12, which is the lower fastened member, is less likely to break when the self-piercing rivet 10 is driven.

As described above, according to the present embodiment, it is possible to suppress cracking of the first fastened member 12 (lower fastened member) with a simple configuration while maintaining manufacturing efficiency.

Second Embodiment

Next, a self-piercing rivet and a manufacturing method for a fastening structure according to a second embodiment of the present disclosure will be described using FIGS. 5 and 6. Note that the first fastened member 12 and the second fastened member 14 as fastened members have substantially the same configuration as the first embodiment, so for the sake of convenience, the same reference numerals are given and explanations are omitted.

Figure 5:
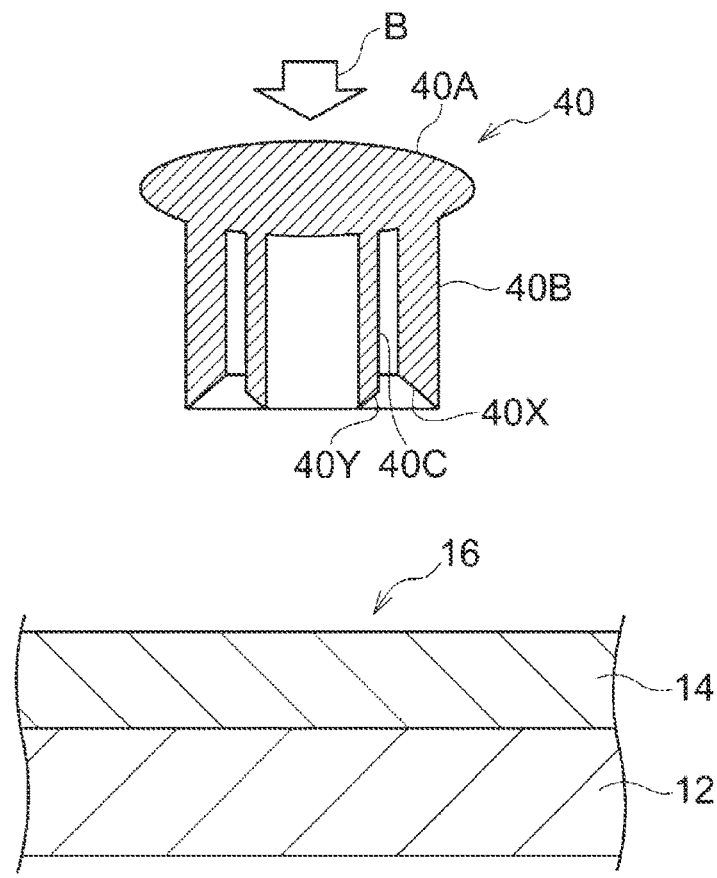
FIG. 5 is a sectional view showing a self-piercing rivet, a first fastened member, and a second fastened member according to the second embodiment in a state before the self-piercing rivet is driven.

The self-piercing rivet 40 shown in FIG. 5 is driven into the overlapping part of a plurality of fastened members (in FIG. 5, the overlapping part 16 of the first fastened member 12 and the second fastened member 14). This is a fastener for fastening a plurality of fastened members (in FIG. 5, the first fastened member 12 and the second fastened member 14). The self-piercing rivet 40 includes a head 40A, an outer cylindrical part 40B integrally extending from the head 40A and formed into a cylindrical shape, and an outer cylindrical part 40B extending integrally from the head 40A. It has an inner cylindrical part 40C spaced apart from each other. The inner cylindrical part 40C is formed in a cylindrical shape, and is thinner than the outer cylindrical part 40B.

At the tip part of the outer cylindrical part 40B, an inclined inner surface 40X is formed, the inner diameter of which gradually increases toward the tip. Thereby, when the outer cylindrical part 40B is driven into the overlapping part 16 of the first fastened member 12 and the second fastened member 14, the distal end side deforms radially outward. Further, at the tip part of the inner cylindrical part 40C, an inclined outer surface 40Y whose outer diameter is gradually reduced toward the distal end side is formed. Thereby, when the inner cylindrical part 40C is driven into the overlapping part 16 of the first fastened member 12 and the second fastened member 14, the tip side deforms radially inward.

The tip position of the outer cylindrical part 40B and the tip position of the inner cylindrical part 40C are aligned in the axial direction of the self-piercing rivet 40. Note that in FIG. 5, arrow B indicates the direction in which the self-piercing rivet 40 is driven into the overlapping part 16 of the first fastened member 12 and the second fastened member 14.

Figure 6:
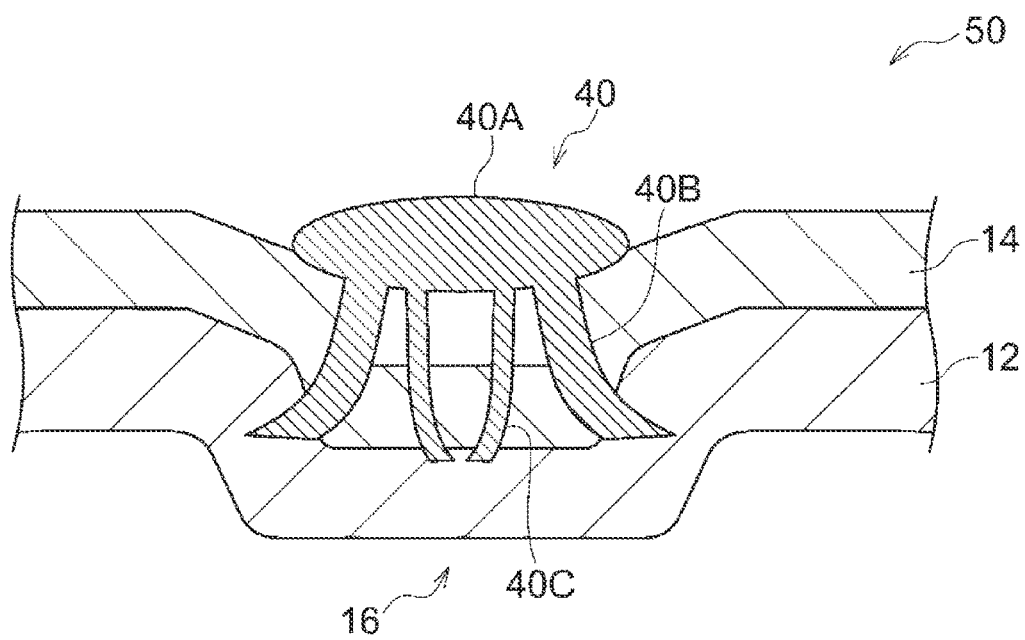
FIG. 6 is a sectional view showing a fastening structure manufactured by the manufacturing method for a fastening structure according to the second embodiment.

In the manufacturing method for a fastening structure according to the second embodiment, a self-piercing rivet 40 is driven into the overlapping part 16 of the first fastened member 12 and the second fastened member 14, and the first fastened member 12 and the second fastened member 14 are fastened as shown in FIG. 6 to manufacture the fastened structure 50. In the step of driving the self-piercing rivet 40 into the overlapping part 16, a device similar to the fastening device 30 (see FIGS. 3 and 4) described in the first embodiment is used.

In the second embodiment described above, as in the case of the first embodiment, while maintaining manufacturing efficiency, the outer cylindrical part 40B and the inner cylindrical part 40C are improved compared to the comparative example in which the cylindrical part is one. It becomes possible to maintain the fastening strength (joining strength) while reducing the thickness of each of the parts. Further, by making the thicknesses of the outer cylindrical part 40B and the inner cylindrical part 40C thinner, the first fastened member 12, which is the lower fastened member, is less likely to break when the self-piercing rivet 40 is driven.

In this way, the second embodiment also makes it possible to suppress cracking of the first fastened member 12 (lower fastened member) with a simple configuration while maintaining manufacturing efficiency.

In addition, in the second embodiment, as shown in FIG. 5, an inclined inner surface 40X whose inner diameter gradually increases toward the distal end is formed at the tip part of the outer cylindrical part 40B, and an inclined outer surface 40Y whose outer diameter is gradually reduced toward the tip side is formed at the tip part of the inner cylindrical part 40C. Therefore, as shown in FIG. 6, when the self-piercing rivet 40 is driven into the overlapping part 16, the tip side of the outer cylindrical part 40B deforms radially outward due to the force received by the inclined inner surface 40X (see FIG. 5) during the driving process and bites into the inside of the overlapping part 16, and the tip side of the inner cylindrical part 40C deforms radially inward due to the force received by the inclined outer surface 40Y (see FIG. 5) during the driving process and bites into the inside of the overlapping part 16. Therefore, the overlapping part 16 can be firmly fastened by the self-piercing rivet 40.

Supplementary Description of Embodiment

In the first and second embodiments shown in FIGS. 1 to 6, the tip positions of the outer cylindrical parts 10B and 40B and the tip positions of the inner cylindrical parts 10C and 40C are the self-piercing rivets 10 and 40. However, as a modification of the first and second embodiments, the tip positions of the outer cylindrical parts (10B, 40B) and the tip positions of the inner cylindrical parts (10C, 40C) are aligned in the axial direction. It is also possible to employ a configuration in which the self-piercing rivets (10, 40) are offset in the axial direction.

Furthermore, in the first and second embodiments described above, the inner cylindrical parts 10C and 40C are set thinner than the outer cylindrical parts 10B and 40B. As a modification example of the first and second embodiments described above, it is possible to adopt a configuration in which the inner cylindrical part (10C, 40C) and the outer cylindrical part (10B, 40B) are set to have the same thickness, and it is also possible to adopt a configuration in which the inner cylindrical part (10C, 40C) is set thicker than the outer cylindrical part (10B, 40B).

Further, in the first and second embodiments, the second fastened member 14 is made of steel as an example, but as a modification of the first and second embodiments, the second fastened member (14) may be made of aluminum alloy. As a supplement, in the first and second embodiments, self-piercing rivets 10 and 40 are applied to fasten (join) dissimilar materials, but self-piercing rivets (10 and 40) may be applied to fasten (join) similar materials.

Further, in the first and second embodiments, the self-piercing rivets 10 and 40 are driven into the overlapping part 16 of the first fastened member 12 and the second fastened member 14, but as a modification of the first and second embodiments, the self-piercing rivet (10, 40) may be driven into the overlapping part of three or more fastened members.

Note that the first and second embodiments and the plurality of modifications described above can be implemented in combination as appropriate.

Although an example of the present disclosure has been described above, it goes without saying that the present disclosure is not limited to the above example, and various modifications other than the above can be carried out without departing from the spirit of the present disclosure.

What is claimed is:

1. A self-piercing rivet that fastens a plurality of fastened members by being driven into an overlapping part of the fastened members, the self-piercing rivet comprising:
   a head;
   an outer cylindrical part that extends from the head, that is provided in a cylindrical shape, and in which a tip side deforms radially outward when driven into the overlapping part; and
   an inner cylindrical part that extends from the head and provided in an inner side of the outer cylindrical part while being distanced from the outer cylindrical part, that is provided in a cylindrical shape, and in which a tip side deforms radially outward or radially inward when driven into the overlapping part,
   wherein a tip part of the outer cylindrical part is provided with an inclined inner surface in which an inner diameter is gradually increased toward the tip side, and a tip part of the inner cylindrical part is provided with an inclined outer surface in which an outer diameter is gradually decreased toward the tip side.

2. A manufacturing method for a fastening structure, wherein the self-piercing rivet according to claim 1 is driven into an overlapping part of a plurality of fastened members to fasten the fastened members.

* * * * *